United States Patent Office 2,939,847
Patented June 7, 1960

2,939,847

MANUFACTURE OF NOBLE METAL CATALYST

Robert M. Smith, Berwyn, and Vladimir Haensel, Hinsdale, Ill., assignors, by mesne assignments, to Universal Oil Products Company, Des Plaines, Ill., a corporation of Delaware No Drawing. Filed Nov. 21, 1957, Ser. No. 697,797

2 Claims. (Cl. 252—439)

The present invention relates to the manufacture of noble metal-containing catalytic composites, and is specifically directed to a particular method of manufacturing active catalytic composites comprising a platinum metal component, a refractory inorganic oxide and sulfur.

Recent discoveries in the field of catalysis have produced methods for manufacturing highly active catalytic composites containing one or more metallic components selected from the family of noble metals, and particularly components comprising platinum and palladium. Previously, the use of catalysts containing these metals, or compounds thereof, has been virtually prohibitive due to the exceedingly high cost of the catalytically active metal component. Active catalysts have been manufactured, however, to contain as little as 1% or less by weight of the noble metal.

Catalytic composites containing platinum and/or palladium have attained extensive commercial utility in industries such as the pharmaceutical, detergent, petroleum, insecticidal, etc., and are employed therein to promote a multitude of reactions among which are hydrogenation, cyclization, polymerization, sulfonation, cracking, dehydrogenation, hydrocracking, oxidation and isomerization. These reactions are among those normally experienced in the reforming of hydrocarbons, the synthesis of organic compounds and/or the treating or purifying of various materials for the removal of undesirable contaminants. Whatever the industry and reaction, it is extremely essential for commercial acceptance that the particular catalyst therein employed exhibit a high degree of activity, and particularly the capability to perform its intended function over an extended period of time.

Although the method of the present invention is specifically directed to catalytic composites containing palladium and/or platinum, catalytic composites containing other noble metals, such as iridium, rhodium and ruthenium, can be manufactured advantageously through its use. Other metals can be composited with the refractory inorganic oxide and the noble metal and subsequently employed therewith as components of a catalyst. These catalysts can also be improved in activity and stability through the use of the method of the present invention. Metals which can be composited as components of the catalyst include metals such as, but not limited to, cesium, vanadium, chromium, tungsten, cobalt, copper, sodium and other alkali metals, silver, rhenium, molybdenum, nickel, other metals of groups VI and VIII of the periodic table, mixtures of two or more, etc. The metal component may exist either in the elemental state, or in combination as the halide, oxide, nitrate, sulfate, etc. It is understood that the benefits afforded catalysts containing different metal components are not equivalent, and that the effects of employing the method of the present invention to the benefit of catalysts containing particular metal components, are not necessarily the same effects observed with regard to some other metal component, or mixtures of metal components.

Generally, the amount of the noble metal component composited with the catalyst is small compared to the quantities of the other components combined therewith. For example, platinum and/or palladium and other noble metals will generally comprise from about 0.01% to about 5% by weight of the total catalyst, and usually from about 0.1% to about 1% by weight. The use of other metal components is dependent upon the use for which the particular catalyst is intended. In any case, however, the concentrations of the metal components will be small, and will generally be within the range of from about 0.01% to about 5% by weight of the total catalyst.

Catalysts are often manufactured to contain chlorine and/or fluorine which are thought to exist therein in some combined form. The addition of these components to the catalytic composite may be effected in any suitable manner which serves to accomplish the desired result. Thus, chlorine and/or fluorine may be added in the form of an acid such as hydrogen chloride, hydrogen fluoride or mixtures thereof. Volatile salts, such as ammonium chloride and ammonium fluoride, afford convenient means of incorporating the chlorine and fluorine into the composite. The other halogens, bromine and iodine, are rather easily removed from the catalyst either during subsequent manufacturing steps, or during processing, and are not employed to any great extent either in conjunction with, or as substitutes for, chlorine and fluorine. The halogen is combined with one or more of the other components of the catalyst, and is, therefore, generally referred to as combined halogen. The combined halogen imparts acidity to the final catalytic composite for the purpose of promoting particular reactions. For this reason, fluorine and chlorine are, in effect, equivalent, although fluorine is generally preferred due to its inherent ability to remain composited with the other catalytically active components throughout the period during which the catalyst is employed.

Whatever the noble metal component, it is generally composited with a highly refractory inorganic oxide such as alumina, silica, zirconia, magnesia, boria, thoria, strontia, etc., and mixtures of two or more including silica-alumina, alumina-boria, silica-thoria, silica-alumina-zirconia, etc. It is understood that the refractory inorganic oxides hereinabove set forth are intended to be illustrative rather than limiting unduly the method of the present invention. It is further understood that these refractory inorganic oxides may be manufactured by any suitable method including separate, successive, or coprecipitation methods of manufacture, or they may be naturally occurring substances such as clays or earths which may or may not be purified or activated with special treatment. The use of the various inorganic oxides does not necessarily yield equivalent results, and the preferred refractory inorganic oxide for use in the process of the present invention comprises alumina.

In the present specification and appended claims, the term alumina is employed to mean porous aluminum oxide in all states of oxidation and in all states of hydration, as well as aluminum hydroxide. The alumina may be synthetically prepared or naturally occurring, and it may be of the crystalline or gel type. Whatever type of alumina is employed, it may be activated prior to use by one or more treatments including drying, calcining, steaming, etc. It may be in a form known as activated alumina, activated alumina of commerce, porous alumina, alumina gel, etc. The various forms of alumina are known by many trivial and trade names, and it is intended to include all such forms. The typical aluminas hereinabove set forth are intended to be illustrative rather than limiting on the scope of the present invention.

The alumina may be prepared by adding a suitable alkaline reagent such as ammonium hydroxide to a salt of aluminum such as aluminum chloride, aluminum nitrate, etc., in an amount to form aluminum hydroxide which, upon drying, is converted to alumina. The alumina may then be formed into any desired shape such as spheres, pills, extrudates, powder, granules, etc. A preferred form of alumina is the sphere, and it is possible to manufacture alumina spheres continuously by passing droplets of an alumina sol into an oil bath, maintained at an elevated temperature, retaining the droplets in said oil bath until the droplets set to firm hydrogen spheroids. The spheres are continuously withdrawn from the oil bath, and immediately thereafter subjected to specific aging treatments to impart certain desired physical characteristics thereto. It is not essential to the method of the present invention that the alumina be prepared in any particular manner, and any suitable method will suffice.

The halogen, when desired, may be added to the catalyst in any suitable manner, and either before or after the formation of the refractory inorganic oxide. The halogen may be added to the refractory oxide before the other components are composited therewith, and this may be accomplished, as hereinbefore stated, through the use of an acid such as hydrogen fluoride and/or hydrogen chloride. In some cases, the alumina may be prepared from the aluminum halide, which method affords a convenient means of compositing the halogen while manufacturing the alumina. The halogen may also be composited with the alumina during the impregnation of the latter with the active metallic component.

Whatever the method of manufacture, or the materials and reagents used in said method, the catalytic composite so produced may be improved in stability, and particularly in the degree of activity, by the method of the present invention. An object of the present invention is to provide a method for producing a highly active noble metal-containing catalyst having a degree of stability required for acceptable performance of its intended function over extended periods of time.

Regardless of the method of manufacture, after prolonged periods of use in performing their intended function, catalysts generally become deactivated as a result of one effect or another, and lose the degree of activity required to function acceptably. Deactivation of a catalyst is seldom sudden, and most often occurs through a gradual decline in activity until such time as the catalyst is no longer capably active to the necessary and desired degree. Catalyst deactivation may result from any one or a combination of adverse effects, such as from substances which are peculiar to a particular catalyst, and which either result in a change in the physical or chemical state of the components of the catalyst, or in a loss of said components. Catalyst deactivation may also result from the deposition of impurities which usually take the form of solids covering the catalytically active surfaces and thereby shielding them from the materials being processed.

The deposition of coke and carbonaceous material is a direct cause of catalyst deactivation, and is quite prevalent during processes for the reforming of hydrocarbons. As hereinbefore set forth, noble metal catalysts and particularly those which comprise platinum, are extensively employed in the petroleum industry for the purpose of promoting a multitude of reactions encountered in the reforming of hydrocarbons. Such reforming processes are effective in transforming a low-actane hydrocarbon, or mixture of hydrocarbons, which may or may not contain impurities prohibiting the use thereof as a motor fuel or blending stock, into a high-octane hydrocarbon mixture of high quality.

We have found that the coke and carbonaceous material, which becomes deposited on the catalyst during the reforming of hydrocarbons, is, for the most part, deposited to a large extent during the initial stages of the reforming operation while the catalyst employed therein exists in its most highly active state with regard to the entire period of operation. The unusually high degree of coke deposition during the initial stage of operation has been found to be due to the inherent ability of fresh, highly active catalyst to promote preferentially detrimental reactions, and one especially deleterious reaction in particular. As the period of time during which the catalyst is employed is extended, this preference diminishes until such time as it no longer exists effectively, and at which time the desired reactions are being promoted to at least the same extent, and in most instances, to a greater extent. The reaction which is especially detrimental to the activity of platinum-containing catalytic composites is the demethylation reaction, which reaction produces a large amount of coke deposition, and which in turn rapidly effects deactivation of the catalyst.

That the demethylation reaction is promoted to a greater degree by new, highly active platinum-containing catalyst than by the same catalyst after an initially short period of use, is believed to be due, at least in part, to the presence of a necessary excess of catalyst activity. In order to attain a long, successful catalyst life, the catalyst, when initially employed, should contain a sufficient reserve of catalytically active components. This reserve provides for the depletion, by deterioration, of these components over long periods of time. We have found that the presence of the necessary excess of catalytic activity induces undesirable side reactions such as demethylation, and consequently, excessive coke formation. The method of the present invention successfully inhibits the demethylation reaction until such time as said reaction is no longer consequential.

It is, therefore, another object of the present invention to provide a catalyst which effectively suppresses those reactions which are particularly detrimental during the initial stages of operation, thereby increasing the stability of the catalyst, and therefore, the effective period of time during which the catalyst exhibits high activity.

In one embodiment, this invention provides a method for manufacturing a noble metal-containing catalyst which comprises commingling a refractory inorganic oxide with a noble metal-containing compound, oxidizing the resulting composite, treating the oxidized composite with sulfuric acid and thereafter subjecting the composite to a calcination treatment.

In a more specific embodiment, the present invention provides a method for manufacturing a platinum catalyst which comprises commingling alumina with chloroplatinic acid in an amount sufficient to yield a final catalyst comprising from about 0.01% to about 1% by weight of platinum, oxidizing the resulting alumina-platinum composite, treating the oxidized composite with sulfuric acid in an amount of from about 0.3% to about 3% by weight of the final catalyst, and thereafter subjecting the composite to a calcination treatment.

We have found that a platinum-containing catalyst, prepared in accordance with the method of the present invention, no longer promotes preferentially the demethylation reaction, and other reactions detrimental to the activity and stability of the catalyst, during the initial stages of operation in which the catalyst is employed. The catalyst of the present invention successfully suppresses these reactions during that period of operation, and continues to inhibit these reactions until such time as the latter are no longer of consequence as compared to the reactions which are promoted to advantage.

By the method of the present invention, a quantity of sulfur, sufficient in amount to inhibit the detrimental reactions, but of such amount as to exhibit no adverse effects upon the catalyst, is composited with the catalyst prior to use. The incorporation of insignificant quantities of sulfur into the catalyst itself offers advantages not to be obtained through the utilization of sulfur, or a compound thereof, either in the material to be processed or in the gas stream which is often recycled through the catalyst during operation. One particular advantage obtained through the utilization of a catalyst containing sulfur, manufactured in accordance with the present invention, is that the sulfur employed therein is not permanently composited therewith, and is subsequently purged from the process system during the operation. Therefore, the sulfur is not present within the system when it no longer serves the desired, necessary function, but would, if present, exert adverse effects upon the activity and stability of the catalyst. Sulfur is known to be an effective deactivating agent of platinum-containing catalyst, and for this reason cannot generally be employed to take advantage of its beneficial characteristics. In the present invention, however, only a minor amount of sulfur which will suffice to inhibit the detrimental reactions, without exerting any deleterious effects, is employed.

When sulfur, or a compound thereof, is added in one form or another to either the hydrocarbon mixture being processed, or to the recycle gas stream passing through the catalyst, only the first portion of catalyst contacted thereby, receives the benefits therefrom. The greater portion of the catalyst is not protected from the initially large carbon deposition, and will be adversely affected by the detrimental reactions. By the same token, the initial portion of catalyst comes into contact with a quantity of sulfur in excess of that which is actually required to inhibit the reaction and which will, in fact, cause premature deactivation of this initial catalyst portion. Since, through the utilization of the catalyst of the present invention, the catalyst exists in intimate contact with sulfur at the time the former is first contacted with the material to be processed, and each individual catalyst particle comes into contact with said material in the presence of the same quantity of sulfur as each and every other individual catalyst particle, these difficulties are not encountered.

It is recognized that the utilization of sulfur in one form or another at some phase of the catalyst manufacturing process is rather widely practiced in the prior art. For example, sulfuric acid is employed in some instances to treat the refractory inorganic oxide, particularly alumina (this procedure being commonly referred to as "peptizing"), for the purpose of preparing the latter for the deposition of the catalytically active metallic component. The sulfur thus deposited, however, does not remain therein through subsequent manufacturing steps and is not a component of the finished catalyst. In a like manner, platinum is often composited with the carrier material in the form of platinic sulfide, is subsequently converted to an oxide of platinum, and again the final composite is devoid of sulfur or compounds thereof.

Briefly, the method of the present invention comprises treating, with sulfuric acid, a finished catalyst. A finished catalyst is one which comprises all the desired catalytically active components and which has been subjected to a high temperature oxidation treatment, usually in the presence of air, for the purpose of firmly affixing said catalytic components to the carrier material. The quantity of sulfuric acid employed should not exceed about 3% by weight of the final catalytic composite, for we have found that the quantity of sulfur resulting from sulfuric acid in excess of about 3% will exert adverse effects upon the catalyst so produced, and the advantages afforded will not be realized. Generally, the quantity of sulfuric acid will lie within the range of from about 0.3% to about 3% by weight of the final catalyst, and, since sulfur admittedly exerts adverse effects, a quantity within the range of from about 0.3% to about 0.9% is preferred. The treatment with sulfuric acid may be effected at room temperature and atmospheric pressure, although these conditions may be changed without materially affecting the results obtained therefrom.

It is essential, following the treatment with sulfuric acid, that the catalytic composite is not subjected to the action of any gaseous material capable of removing the sulfur therefrom. Therefore, the sulfur is not composited with the catalyst until after the last oxidation or reducing treatment, and the catalyst containing sulfur is subjected only to a calcination treament for the purpose of drying the composite and further affixing the catalytic components thereto. The calcination treatment may be effected at any suitable temperature not exhibiting destructive tendencies toward the composite, and the calcination temperature will generally lie within the range of from about 800 to about 1200° F.

Other sulfur-containing compounds may be utilized as the means of compositing sulfur with the catalyst. Caution must be exercised, however, to insure that the compound selected does not effect the deposition of undesirable components. Suitable sulfur-containing compounds, therefore, in addition to sulfuric acid, include sulfurous acid, sulfur dioxide, sulfur trioxide, benzene sulfonic acid, toluene sulfonic acid, etc.

The following examples are given to further illustrate the method of the present invention, and to indicate clearly the benefits afforded through the utilization thereof. It is not intended to limit the same to the specific materials, conditions and/or concentrations involved.

The catalytically active carrier material employed in the examples comprised alumina containing combined fluoride in an amount of about 0.35% by weight. This composite was prepared from a mixture of equal volumes of a 28% by weight solution of hexamethylene tetramine in water and an alumina sol containing 12% by weight aluminum and 10.8% by weight of combined chloride. The fluoride was added by way of an aqueous solution of hydrogen fluoride, and the mixture was formed into hydrogel spheroids by the oil-drop method. The spheres were washed, dried to a temperature of 650° C. and subsequently calcined at that temperature.

EXAMPLE I

A portion of the calcined spheres was commingled with 99 milliliters of an aqueous solution of chloroplatinic acid containing 10 milligrams of platinum per milliliter, plus 60 milliliters of water, and ammonium hydroxide in amount equivalent to 0.3 gram of $NH_3$ per gram of platinum. The mixture was evaporated to dryness over a water bath at a temperature of 99° C., and further dried in a rotary drier to a temperature of 200° C. for a period of 3 hours. The chloride concentration was reduced to a level of 0.35% by weight through the utilization of steam, to remove chloride in excess of this amount. The composite was thereafter subjected to an air-oxidation treatment, at a temperature of 500° C., for a period of one hour. The finished catalyst was then divided into two separate portions.

The two catalyst portions were subjected individually to a particular activity-stability test which consisted of passing a standard hydrocarbon charge stock, having a boiling range of about 200° F. to about 400° F., through the catalyst at a liquid hourly space velocity (volumes of hydrocarbon charged per volume of catalyst) of from about 2.0 to about 3.0, in an atmosphere of hydrogen present in a mol ratio of hydrogen to hydrocarbon of 6:1 for a period of about 20 hours. The reaction zones were maintained at a temperature of 500° C., and under an imposed pressure of 500 p.s.i.g. The zones were cooled and depressured; the catalyst portions were removed and analyzed for carbon deposition, one indication of the relative stability of the catalysts.

The liquid product collected from each zone, over the entire period of the test, was analyzed for octane rating (F–1 clear). The first catalyst portion, designated as catalyst "A," was tested in a small scale unit completely void of sulfur and compounds thereof. The second catalyst portion, catalyst "B," was tested in an atmosphere of hydrogen sulfide equivalent to about 15 grains of $H_2S$ per 100 cubic feet of recycle gas. The results of the activity-stability test are given in Table I.

*Table I*

| Catalyst Designation | A | B |
|---|---|---|
| H₂SO₄ Addition, wt. percent | 0 | 0 |
| Analysis, wt. percent: | | |
| Platinum | 0.750 | 0.750 |
| Fluoride | 0.35 | 0.35 |
| Chloride | 0.35 | 0.35 |
| Total Combined Halogen | 0.70 | 0.70 |
| Octane Rating, F-1 Clear | 94.8 | 95.6 |
| Excess Exit Gases, s.c.f./bbl.: | | |
| Recycle | 873 | 757 |
| Debuntanizer | 426 | 489 |
| Total Exit Gas | 1,299 | 1,246 |
| Debutanizer Ratio | 0.328 | 0.392 |
| Activity Ratings, Percent of Standard: | | |
| Debutanizer Overhead @ Octane No. | 94 | 105 |
| Debutanizer Overhead @ Total Gas | 94 | 118 |
| Space Velocity | 101 | 113 |
| Carbon Deposition, wt percent | 1.40 | 0.63 |

For the purpose of a clear understanding of the data, several definitions are thought to be required:

(1) The excess recycle gas is that quantity of gas in excess of the amount required to maintain the desired pressure in the reaction zone. Analyses have shown that this gas is, for all practical purposes, pure hydrogen (approximately 80-95 mol percent).

(2) The excess debutanizer gas is that gas which is composed of light paraffins, methane, ethane, propane and butane, and some hydrogen, and results mainly from the hydrocracking reactions effected within the reaction zone.

(3) The debutanizer-gas ratio is the ratio of excess debutanizer gas to total excess gas, and is indicative of the relative yield of desirable product in the effluent from the reaction zone—i.e.: the lower the ratio, the greater the possible yield of liquid product.

(4) The activity ratings are employed on a comparative basis with respect to a catalyst having a high concentration of platinum (0.750% by weight), and which has been assigned activity ratings of the value of 100: they are first compared at identical octane ratings and total excess gas production, and at equivalent liquid hourly space velocities. In the latter instance, the larger the number, the more active the catalyst, that is, more charge stock could be processed to the same volumetric yield and quality of product. In the former instances, the smaller the number, the greater the yield of high-octane, debutanized final product.

The results of the activity-stability tests on catalysts "A" and "B" indicate the detrimental effect created through the indiscriminate use of sulfur (as hydrogen sulfide in the recycle gas), even though there has been a significant decrease in the degree of carbon deposition. Although there has been an increase of 12% in the space velocity activity, there have been losses of 11% and 24% in the debutanizer-overhead activities. The volumetric yield of high quality product has been lowered to the extent that the utilization of such a process is less economical. This decrease in yield is further evidenced by the large increase in the debutanizer-gas ratio. As hereinafter illustrated, these harmful effects are not experienced by the catalyst of the present invention.

EXAMPLE II

A catalyst, prepared as indicated in the previous example was treated with 220 milliliters of water containing 0.3% by weight of sulfur as sulfuric acid (0.9% by weight of sulfuric acid, based upon the weight of the final catalytic composite). The resulting mixture of oxidized catalyst and sulfuric acid was allowed to evaporate to dryness and subsequently calcined at a temperature of 930° F. in a muffle furnace. This catalyst was designated as catalyst "C," and was subjected to the activity-stability test previously described.

A second catalyst, designated as catalyst "D," was prepared in the same manner as catalyst "C" with one exception; the treatment with sulfuric acid was effected on the calcined alumina spheres prior to the compositing of the platinum and subsequent oxidation treatment.

The results of the activity-stability tests clearly indicate the necessity of effecting the sulfur treatment on a previously oxidized catalytic composite, and subjecting the treated catalyst only to a calcination treatment. The results of the tests are indicated in Table II.

*Table II*

| Catalyst Designation | C | D |
|---|---|---|
| H₂SO₄ Addition, wt. percent | 0.9 | 0.9 |
| Analysis, wt. percent: | | |
| Platinum | 0.750 | 0.750 |
| Fluoride | 0.34 | 0.32 |
| Chloride | 0.43 | 0.37 |
| Total Combined Halogen | 0.77 | 0.69 |
| Octane Rating, F-1 Clear | 95.4 | 94.9 |
| Excess Exit Gases, s.c.f./bbl.: | | |
| Recycle | 925 | 907 |
| Debutanizer | 425 | 430 |
| Total Exit Gas | 1,350 | 1,337 |
| Debutanizer Ratio | 0.315 | 0.322 |
| Activity Ratings, Percent of Standard: | | |
| Debutanizer Overhead @ Octane No. | 91 | 87 |
| Debutanizer Overhead @ Total Gas | 83 | 95 |
| Space Velocity | 109 | 102 |

EXAMPLE III

Two portions of the oxidized catalyst, prepared as previously described, were treated with sulfuric acid in concentrations of 0.3% and 3.1% by weight of the final catalytic composites. The catalysts were designated as catalysts "E" and "F" respectively, and the results of the activity tests are given in Table III.

It is readily ascertained that the maximum practical limit of the sulfuric acid concentration employed is about 3% by weight of the final catalytic composite. Catalyst "F" has indicated a substantial decrease in space velocity activity, and, although the volumetric-yield activities are comparable to catalyst "E," this factor is sufficient to warrant discarding such a catalyst in favor of one which yields advantageous results in all three of the activity classifications.

*Table III*

| Catalyst Designation | E | F |
|---|---|---|
| H₂SO₄ Addition, wt. percent | 0.3 | 3.1 |
| Analysis, wt. percent: | | |
| Platinum | 0.750 | 0.750 |
| Fluoride | 0.34 | 0.36 |
| Chloride | 0.47 | 0.34 |
| Total Combined Halogen | 0.81 | 0.70 |
| Octane Rating, F-1 Clear | 95.2 | 93.5 |
| Excess Exit Gases, s.c.f./bbl.: | | |
| Receiver | 906 | 906 |
| Debutanizer | 436 | 399 |
| Total Excess Gas | 1,342 | 1,305 |
| Debutanizer Ratio | 0.324 | 0.305 |
| Activity Ratings, Percent of Standard: | | |
| Debutanizer Overhead @ Octane Number | 96 | 93 |
| Debutanizer Overhead @ Total Gas | 87 | 87 |
| Space Velocity | 103 | 88 |
| Carbon Deposition, wt. percent | 1.07 | 0.96 |

EXAMPLE IV

A platinum-containing catalytic composition was manufactured from calcined alumina spheres which did not contain combined fluoride, and the chloride concentration was allowed to remain at a level of about 1% by weight. The final catalytic composite indicated an apparent bulk density approximately 20% greater than that of the catalysts from the previous examples. The catalyst was divided into two portions, the first, catalyst "G," being subjected to the activity-stability test in its manufactured state, while the second catalyst portion, catalyst "H," was treated with an aqueous solution of sulfuric acid in a concentration of 0.9% by weight of the final catalyst. Said second catalyst portion was then subjected to a calcination treatment at a temperature of 930° F., and subsequently submitted to the activity-stability test previously described.

The results of the activity-stability tests are given in Table IV, and it is readily ascertained that the method of the present invention yields a catalyst which possesses an unusually high activity and stability.

Table IV

| Catalyst Designation | G | H |
|---|---|---|
| $H_2SO_4$ Addition, wt. percent | 0 | 0.9 |
| Analysis, wt. percent: | | |
| Platinum | 0.750 | 0.750 |
| Fluoride | 0 | 0 |
| Chloride | 1.13 | 1.00 |
| Total Combined Halogen | 1.13 | 1.00 |
| Octane Rating, F-1 Clear | 95.7 | 97.0 |
| Excess Exit Gases, s.c.f./bbl.: | | |
| Receiver | 855 | 995 |
| Debutanizer | 488 | 406 |
| Total Excess Gas | 1,343 | 1,401 |
| Debutanizer Ratio | 0.363 | 0.289 |
| Activity Ratings, Percent of Standard: | | |
| Debutanizer Overhead @ Octane Number | 104 | 82 |
| Debutanizer Overhead @ Total Gas | 97 | 67 |
| Space Velocity | 114 | 140 |
| Carbon Deposition, wt. percent | 2.58 | 1.24 |

The foregoing examples clearly indicate the method of the present invention and the benefits derived through the use thereof. The advantages available through the utilization of sulfur on the catalyst have been obtained without detrimentally affecting the catalyst, and a more active and stable catalyst has been produced.

We claim as our invention:

1. A method for manufacturing a platinum catalyst which comprises impregnating alumina with chloroplatinic acid in an amount sufficient to yield a final catalyst comprising from about 0.01% to about 5% by weight of platinum, subjecting the resulting alumina-platinum composite to air-oxidation, adding to the oxidized composite sulfuric acid in an amount of from about 0.3% to about 3% by weight of the final catalyst, and thereafter subjecting the composite to a calcination treatment at a temperature of from about 800° F. to about 1200° F.

2. The method of claim 1 further characterized in that said amount of sulfuric acid is in the range of from about 0.3% to about 0.9% by weight of the final catalyst.

References Cited in the file of this patent

UNITED STATES PATENTS

| | | |
|---|---|---|
| 2,566,521 | Haensel | Sept. 4, 1951 |
| 2,780,584 | Doumani | Feb. 5, 1957 |